United States Patent [19] [11] 3,894,639
Keck et al. [45] July 15, 1975

[54] STACKING OF BRICKS

[75] Inventors: Dieter Keck, Laggenbeck, Westphalia, Germany; Georg Pfister, Doylestown, Pa.

[73] Assignee: C. Keller and Co., Westphalia, Germany

[22] Filed: Apr. 19, 1974

[21] Appl. No.: 462,516

[30] Foreign Application Priority Data
Oct. 26, 1973 Germany.......................... 2353754

[52] U.S. Cl.................. 214/6 A; 198/30; 214/152
[51] Int. Cl............................................. B65g 57/24
[58] Field of Search...... 214/6 A, 6 N, 6 DK, 8.5 C, 214/152; 198/30, 34

[56] References Cited
UNITED STATES PATENTS
| | | | |
|---|---|---|---|
| 3,095,678 | 7/1963 | Cliff et al........................ | 214/6 A X |
| 3,608,746 | 9/1971 | Meyer............................... | 214/6 A |
| 3,625,375 | 12/1971 | Lingl................................ | 214/6 A |
| 3,776,398 | 12/1973 | Stuart............................... | 214/8.5 C |

FOREIGN PATENTS OR APPLICATIONS
1,077,421  7/1967  United Kingdom................ 214/6 A

*Primary Examiner*—Robert J. Spar
*Assistant Examiner*—Leslie J. Paperner
*Attorney, Agent, or Firm*—Mason, Mason & Albright

[57] ABSTRACT

A stack of bricks having one layer with passages for receiving the arms of a fork-lift device and a supporting layer above this layer and oriented through 90° to prevent collapse of upper layers into the passages, is formed using a device having gripper means and a stacking table. The gripper means deposit the various layers on the stacking table and are pivotal through 90° whereby to orientate appropriately the supporting layer relative to an underlying layer provided with the passages. When the supporting layer is deposited on the partially-formed stack, at least one row projects beyond the edge of the stack and is supported by a depositing table immediately downstream of the stacking table. During successive stacking operations, a plurality of such rows are accumulated on the depositing table and form a supporting layer to be used during a subsequent stacking operation, this supporting layer being transferred from the depositing table to a partially-formed stack using gripper means.

4 Claims, 4 Drawing Figures

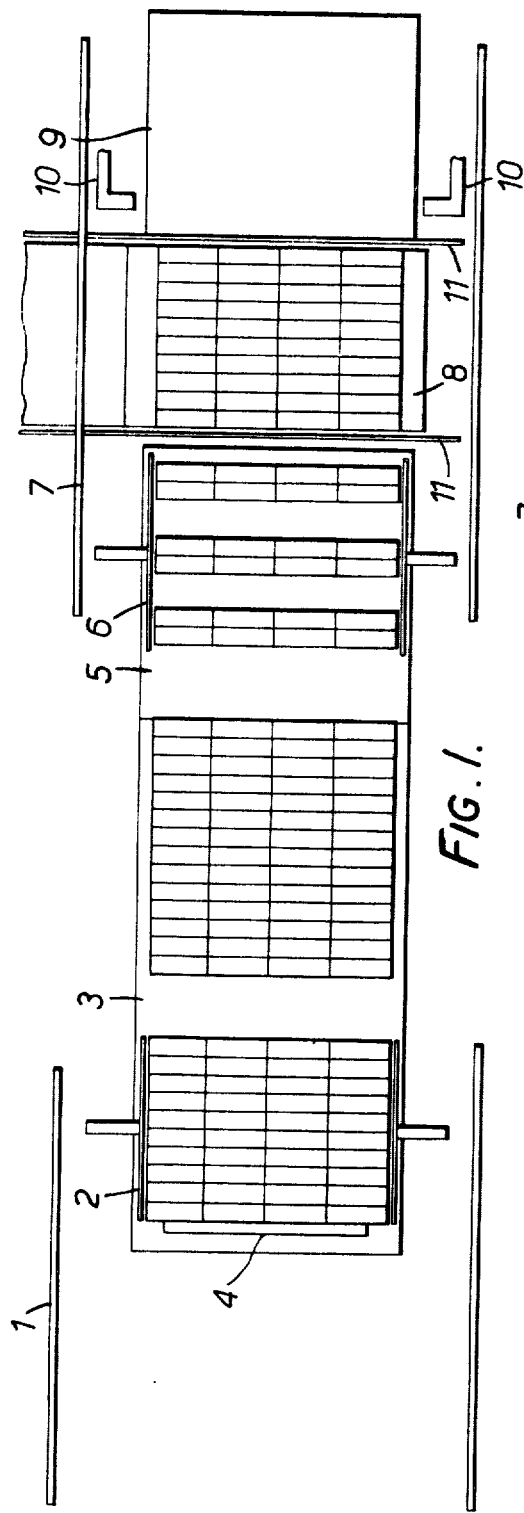
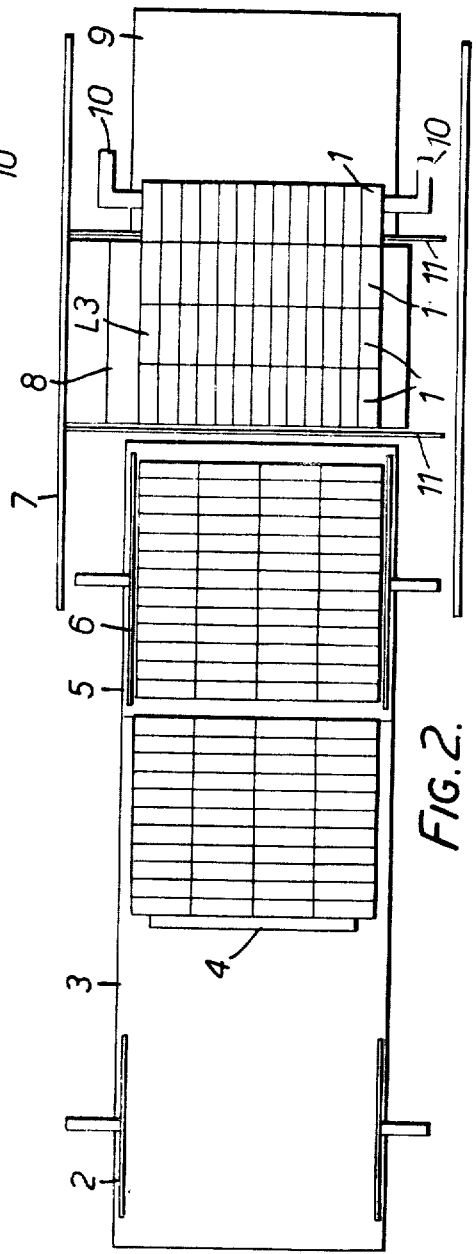

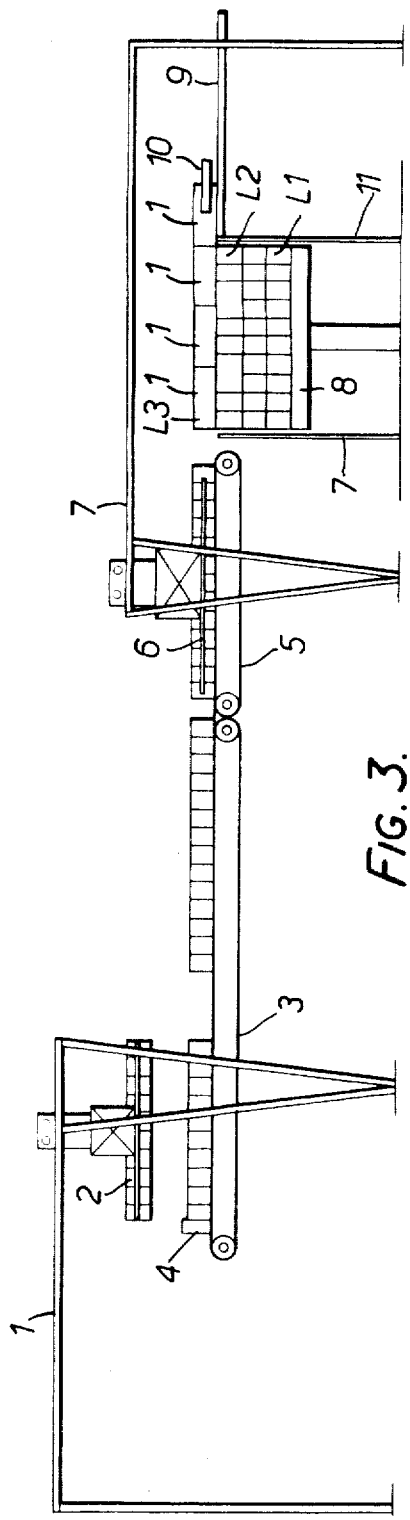
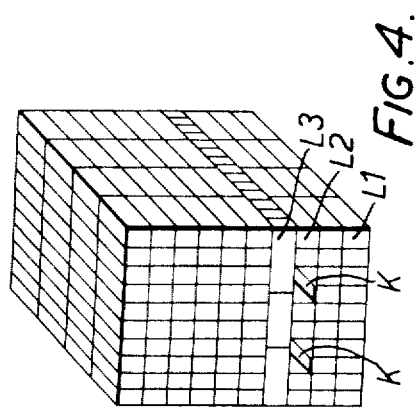

STACKING OF BRICKS

BACKGROUND OF THE INVENTION

1. Field of the Invention

The present invention relates to the stacking of bricks.

2. Descriptiton of the Prior Art

German Patent Specification No. 1,918,017 relates to a device for stacking bricks in layers which comprises a horizontally and vertically displaceable gripping device for receiving layers of bricks from a transport track provided with an end stop and for depositing same on a stacking table.

This previously proposed device is only suitable for the formation of tightly compact stacks of bricks.

A requirement exists for stacks of bricks which are provided with passages to receive the arms of a fork-lift device.

SUMMARY OF THE INVENTION

According to the present invention, there is provided a device for forming a stack of bricks comprising a plurality of first layers of bricks, a second layer of bricks in which passages are provided to receive the arms of a fork-lift device, and a supporting layer positioned above the second layer and being displaced through 90° with respect to the second layer to support those of said first layers located above the second layer and to prevent collapse thereof into the passages, said device comprising support means, first gripper means, operative to deposit layers of bricks on the support means, transport means, means for feeding the layers from the support means such that a said first or said second layer is selectively formed on the transport means, a lowerable stacking table, second gripper means operative to carry the layer from the transport means and to deposit the layer on the table, said second gripper means being selectively pivotal through 90° whereby a said first layer can be pivoted through 90° with respect to a preceding second layer whereby to form the supporting layer, a depositing table cownstream of the stacking table to receive at least one superfluous row of said supporting layer, said depositing table being arranged to accumulate a plurality of superfluous rows from successive stacking operations whereby to form from said rows a supporting layer for use in a subsequent stacking operation.

According to another aspect of the present invention, there is provided a meyhod of forming a stack of bricks, comprising a plurality of first layers, a second layer in which passages are provided to receive the arms of a fork-lift device, and a supporting layer positioned above the second layer, the supporting layer being displaced through 90° with respect to the second layer to support those of the first layers above the second layer and to prevent collapse thereof into the passages, said method comprising the steps of depositing layers of bricks on a support, transferring the layers onto a stacking table, separating rows of bricks in a selected layer during said transfer whereby to form said second layer, pivoting through 90° during said transfer the layer following said second layer whereby to form the supporting layer, removing at least one row from said supporting layer and depositing same on a depositing table downstream of the stacking table, accumulating a plurality of said rows on said depositing table from successive stacking operations, forming a said supporting layer from the accumulated rows, and transferring the supporting layer from the depositing table onto a said second layer during a subsequent stacking operation.

BRIEF DESCRIPTION OF THE DRAWINGS

The invention will now be described, by way of example only, with reference to the accompanying diagrammatic drawings, in which:

FIG. 1 is a plan view of the device in accordance with the invention, the device being shown in a first operational position;

FIG. 2 is a plan view showing the device in a second operational position;

FIG. 3 is a side elevation corresponding to FIG. 2; and

FIG. 4 is a perspective view of a stack of bricks formed with the aid of the device.

DESCRIPTION OF THE PREFERRED EMBODIMENT

The device shown in FIGS. 1 to 3 is used for the formation of a stack of bricks as shown in FIG. 4. The stack compraises several superposed layers $L_1$ which are built up from bricks arranged upright and closely together, these layers $L_1$ being compact. In the illustrated version each layer $L_1$ consists of four rows of bricks, each row being composed of 10 bricks.

Furthermore there is provided a layer $L_2$ likewise consisting of upright bricks; however, this layer $L_2$ is provided with two passages K extending through the layer and arranged to receive two arms of a fork-lift stacker.

Above the layer $L_2$ there is arranged a layer $L_3$ which consists of upright bricks arranged closely together and which serves to carry the weight of the layers $L_1$, above the layer $L_2$ and to prevent these layers from collapsing into the passages. In the illustrated version the layer $L_3$ consists of three rows of bricks, each row being composed of 13 bricks and extending transversely to the rows of the other layers.

The device shown in FIGS. 1 to 3 can also produce stacks which differ from that shown in FIG. 4 in respect of the arrangement and number of the individual layers.

As shown in FIG. 1 loose stacks of bricks are brought by means of kiln trolleys (not shown in detail in the interests of clarity) into a starting position where the individual layers are picked up by gripper means 2 which is horizontally and vertically displaceable on a crane runway 1, and are deposited on a support. This support can be in the form of a depositing table or transport means, In the arrangement of FIG. 1 the support is in the form of transport means 3 which comprises a conveyor belt guided around two guide pulleys.

If the individual layers of the stack on the kiln trolley consist of double layers, the gripper means 2 deposits the double layer on the transport means 3, moves slightly upwardly in a vertical direction, grips the upper layer of the double layer and deposits it behind the lower layer which has meanwhile been advanced by the transport means 3.

The brick layers present on the transport means 3 are then moved on by means of a pusher 4 so that an uninterrupted, i.e. compact, self-contained layer is formed at the downstream end portion of the transport means 3.

From this self-contained layer, a layer is now formed on a subsequent transport means 5 which layer corresponds to one of the layers to be provided in the finished stack. This may be a layer $L_1$, a layer $L_2$ or a layer $L_3$.

If it is a layer $L_1$, it is compact, i.e. the individual bricks are arranged closely together.

FIG. 1 shows a layer $L_2$ formed on the transport means 5, gaps being provided between individual groups of rows of the layer whereby to form the passages K. These gaps can be formed in various ways which will be readily apparent to those skilled in the art. For example, the gaps may be formed by briefly stopping and then restarting the transport means 3 according to a predetermined program.

Gripper means 6, which is movable on a crane runway 7 and is pivotal about a vertical axis, picks up the layer on the transport device 5, e.g. the layer $L_1$, and deposits it on a stacking table 8. When a stack according to FIG. 4 is to be formed, the table 8 which can be lowered stepwise by an amount corresponding to the depth of each layer initially receives two upright layers $L_1$; the gripper means 6 then transfers the layer $L_2$ formed on the transport means 5 to the stacking table 8 so that three layers in all are now present on the latter. The layers $L_1$, $L_2$ are transferred to the lowering table 8 without rotation.

During transfer of the layer $L_3$ from the transport means 5 to the stacking table 8, the gripper means pivot the layer through 90° into the configuration shown in FIG. 2. Since in the stack shown in the drawing the layer $L_3$ has four longitudinal rows 1, whilst only three longitudinal rows 1 are required for the formation of this stack, the endmost row is discarded and is deposited on a table 9 downstream of the table 8. This discarded row is then gripped by gripper means 10 and shifted by the gripper means 6 to the right in FIG. 3 to such an extent that further discarded rows can be deposited on the table 9 during the formation of subsequent stakes.

After three stacks have been formed, there exists on the table 9, a layer $L_3$ composed of three rows of bricks. During formation of the subsequent stack, the gripper means 6 lifts the layer $L_3$ from the table 9 and places it on the layer $L_2$ which is present on the lowering table 8.

As will be apparent, it is also possible to form rectangular stacks where each alternate layer is turned through 90°. According to the method described above layers are formed on the depositing table 9 which are included in the stack.

Guide plates 11 can be provided on either side of the table 8.

The device described enables stacks to be formed in a simple manner with passages for receiving the arms of a fork-lift device.

What is claimed is:

1. A device for forming a stack of bricks comprising a plurality of first layers of bricks, a second layer of bricks in which passages are provided to receive the arms of a fork-lift device, and a supporting layer positioned above the second layer and being displaced through 90° with respect to the second layer to support those of said first layers located above the second layer and to prevent collapse thereof into the passages, said device comprising
    support means,
    first gripper means, operative to deposit rectangular shaped layers of bricks on the support means,
    transport means,
    means for feeding the layers from the support means such that a said first or said second layer is selectively formed on the transport means,
    a lowerable stacking table,
    second gripper means operative to carry the layer from the transport means and to deposit the layer on the table, said second gripper means being selectively pivotal through 90° whereby a said first layer can be pivoted through 90° with respect to a preceding second layer whereby to form the supporting layer,
    a depositing table downstream of the stacking table to receive at least one superfluous row of said supporting layer, whereby a plurality of superfluous rows from successive stacking operations are accumulated on said depositing table and are used to form a supporting layer for use in a subsequent stacking operation.

2. A device according to claim 1, wherein the second gripper means is operative to move said superfluous rows along said depositing table and to deposit a said supporting layer formed thereon onto a said second layer on the stacking table.

3. A device according to claim 1, wherein said stacking table has a pair of opposite sides, said device further comprising
    a guide plate arranged at each of said opposite sides.

4. A method of forming a stack of bricks comprising a plurality of first layers, a second layer in which passages are provided to receive the arms of a fork-lift device, and a supporting layer positioned above the second layer, the supporting layer being displaced through 90° with respect to the second layer to support those of the first layers above the second layer and to prevent collapse thereof into the passages, said method comprising the steps of depositing layers of bricks on a support, transferring the layers onto a stacking table, separating rows of bricks in a selected layer during said transfer whereby to form said second layer, pivoting through 90° during said transfer the layer following said second layer whereby to form the supporting layer, removing at least one row from said supporting layer, and depositing same on a depositing table downstream of the stacking table, accumulating a plurality of said rows on said depositing table from successive stacking oerations, forming a said supporting layer from the accumulated rows, and transferring the supporting layer from the depositing table onto a said second layer during a subsequent stacking operation.

* * * * *